US011539532B2

(12) United States Patent
Zeh et al.

(10) Patent No.: US 11,539,532 B2
(45) Date of Patent: Dec. 27, 2022

(54) COMPILING A SIGNATURE

(71) Applicant: Infineon Technologies AG, Neubiberg (DE)

(72) Inventors: Alexander Zeh, Munich (DE); Wieland Fischer, Munich (DE); Stefan Koeck, Ottenhofen (DE)

(73) Assignee: Infineon Technologies AG, Neubiberg (DE)

( * ) Notice: Subject to any disclaimer, the term of this patent is extended or adjusted under 35 U.S.C. 154(b) by 99 days.

(21) Appl. No.: 17/038,298

(22) Filed: Sep. 30, 2020

(65) Prior Publication Data

US 2021/0111903 A1 Apr. 15, 2021

(30) Foreign Application Priority Data

Oct. 10, 2019 (DE) .......................... 102019127354.4

(51) Int. Cl.
*H04L 9/08* (2006.01)
*H04L 9/32* (2006.01)

(52) U.S. Cl.
CPC .......... *H04L 9/3252* (2013.01); *H04L 9/0869* (2013.01); *H04L 9/0877* (2013.01); *H04L 9/0894* (2013.01); *H04L 2209/12* (2013.01)

(58) Field of Classification Search
CPC ... H04L 9/3252; H04L 9/0869; H04L 9/0877; H04L 9/0894; H04L 2209/12
See application file for complete search history.

(56) References Cited

U.S. PATENT DOCUMENTS

| 8,886,964 | B1 | 11/2014 | Tonkinson |
| 10,630,473 | B2 | 4/2020 | Falk et al. |
| 2006/0224878 | A1* | 10/2006 | Datta .................... G06F 21/575 713/2 |
| 2008/0189500 | A1* | 8/2008 | Jennings ............... G06F 9/3824 711/164 |
| 2014/0359186 | A1* | 12/2014 | Helmschmidt ....... G06F 21/602 713/193 |
| 2017/0337380 | A1* | 11/2017 | Domke .................. G06F 9/442 |
| 2019/0123897 | A1* | 4/2019 | Adams .................. H04L 9/0841 |
| 2019/0190723 | A1* | 6/2019 | Lee ........................ H04L 9/3247 |
| 2020/0050478 | A1* | 2/2020 | Underwood .......... G06F 9/4812 |
| 2020/0136819 | A1* | 4/2020 | Bae ....................... H04L 9/3252 |

(Continued)

FOREIGN PATENT DOCUMENTS

| DE | 102015212657 A1 | 1/2017 |
| DE | 102015212887 A1 | 1/2017 |

OTHER PUBLICATIONS

Shijun Zhao et al. "Providing Rootof Trust for ARM TrustZone using On-Chip SRAM", 2014, ACM, p. 25-36 (Year: 2014).*

(Continued)

*Primary Examiner* — Catherine Thiaw
(74) *Attorney, Agent, or Firm* — Harrity & Harrity, LLP

(57) ABSTRACT

A device is suggested including a cryptographic module, wherein the device is operable in a secure mode and in a non-secure mode, wherein the cryptographic module is configured in the secure mode by storing a secret key and a seed value in the cryptographic module, and wherein the device is operable in the non-secure mode to generate a signature based on input data utilizing the secret key and the seed value. Also, a method for operating such device is provided.

23 Claims, 1 Drawing Sheet

(56) References Cited

U.S. PATENT DOCUMENTS

2020/0267000 A1\* 8/2020 Schwarz ............... H04L 9/3247
2020/0326963 A1\* 10/2020 Bhattacharya ........ H04L 9/3236

OTHER PUBLICATIONS

He Sun et al. "TrustICE: Hardware-assisted Isolated Computing Environments on Mobile Devices", 2015, 45th Annual IEEE/IFIP International Conference on Dependable Systems and Networks, p. 367-378 (Year: 2015).\*

\* cited by examiner

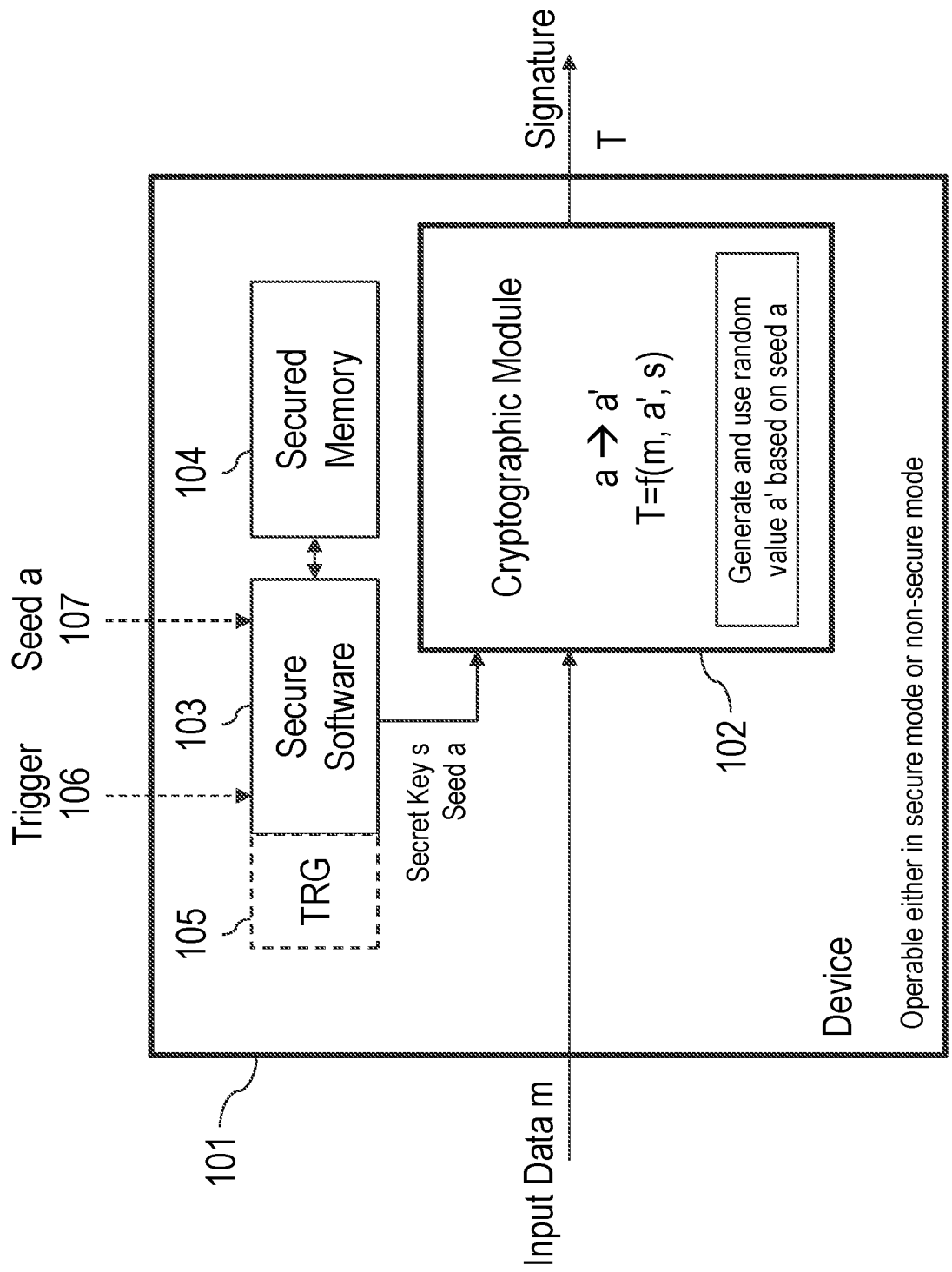

COMPILING A SIGNATURE

RELATED APPLICATION

This application claims priority to German Patent No. 102019127354.4, filed on Oct. 10, 2019, which is incorporated herein by reference in its entirety.

FIELD

Hardware protected cryptographic keys play an essential role in hardware security and attain an increased interest in the area of automotive security.

BACKGROUND

Key distribution and key management are one core aspect for any security setup regarding in-vehicle networks and secured backend communication. An important requirement is that the various entities acting as participants of such communication need to be trusted, i.e. authenticated. Such entity may be an electronic control unit (ECU) or any processing unit, e.g., a micro controller unit (MCU) that is located within or external to the ECU. The entity may be located within a vehicle or outside of the vehicle. Examples are: an Internet server, a mobile consumer device or the like. Several entities communicating over the network may be supplied by different vendors. The entity may be configured with an initial key, which builds the root of trust. Confidentiality, authenticity and integrity may be based on this initial key. Hence the security of the initial key is of high importance.

A digital signature is a mathematical scheme for verifying the authenticity of digital messages or documents. A valid digital signature, where the prerequisites are satisfied, gives a recipient very strong reason to believe that the message was created by a known sender (authentication), and that the message was not altered in transit (integrity). Digital signatures employ asymmetric cryptography (also referred to as public-key cryptography).

Reference is made, e.g., to https://en.wikipedia.org/wiki/Digital_signature and https://en.wikipedia.org/wiki/Public-key_cryptography.

It is therefore an objective to provide a solution that allows generating a signature in an efficient manner.

SUMMARY

Examples suggested herein may in particular be based on at least one of the following solutions. Combinations of the following features may be utilized to reach a desired result. The features of the method could be combined with any feature(s) of the device, apparatus or system or vice versa.

A device is suggested including a cryptographic module,
wherein the device is operable in a secure mode and in a non-secure mode,
wherein the cryptographic module is configured in the secure mode by storing a secret key and a seed value in the cryptographic module,
wherein the device is operable in the non-secure mode to generate a signature based on input data utilizing the secret key and the seed value.

It is noted that the signature is generated by the device only if the device is in the non-secure mode. In the non-secure mode, the software/firmware compiling the signature has no (read or write) access to the secret key and/or the seed value. Hence, the device may preferably be either operated exclusively in the secure mode or exclusively in the non-secure mode. This may be achieved by at least one piece of software or firmware that can be run on the device.

According to an embodiment, the device enters the non-secure mode after the configuration is concluded or after a startup phase of the device has ended.

It is noted that the device may re-enter the configuration at a later point in time via the secure mode. Preferably, authentication means are provided that only allow (re) entering the secure mode if a security requirement is fulfilled. Hence, a non-authorized entity should gain no access to the confidential information, e.g., the secret key and the seed value. Also, it is an option to prohibit entering the secure mode, e.g., from outside the device thereby hardening the device against unwanted access towards the secret key or the seed value.

According to an embodiment, the secure mode is operated via a first software or firmware and the non-secure mode is operated via a second software or firmware.

According to an embodiment, the first software or firmware
is exclusively run during the secure mode,
is configured to exclusively read the secret key from a memory of the device and
store the secret key and the seed value in a secured memory of the cryptographic module.

The memory from which the secret key is read may also be a secured memory of the device that is only accessible during the secure mode.

According to an embodiment, upon termination of the first software or firmware, the device enters the non-secure mode.

According to an embodiment, the second software or firmware
has no access to the secret key or to the seed value,
generates the signature using the cryptographic module, wherein the cryptographic module uses the secret key and the seed value without granting the second software access to either the secret key or the seed value.

According to an embodiment, the seed value is generated by the device or by an external unit and supplied to the cryptographic module.

The secure memory of the cryptographic module may include at least one secured memory, in particular at least one secured register.

The seed value may include a value determined by a random generator, in particular a true random generator, which may be part of the device separate from the cryptographic module or it may be part of the cryptographic module or it may be external to the device (as well as to the cryptographic module).

According to an embodiment, at least one random value is generated based on the seed value.

It is noted that the random value may be any true-random or pseudo-random value. The random value may be based on a deterministic function utilizing the seed value. In other words, the term "random value" used herein does not require the value to be a true random value or number, it just refers to a value that is determined based on the seed value. This approach allows generating a larger number of random values based on the seed value. This may in particular be beneficial in case the seed value has a high entropy and/or is renewed after a predetermined amount of time and/or after a certain event or trigger. Hence, determining the output data based on a random value of high entropy hardens the device and the function processed by the device against potential attacks.

Preferably, the seed value has a higher entropy than the random value.

According to an embodiment, the random value is determined based on the seed value for each signature or for each n-th signature.

Hence, different random values may be used for compiling subsequent signatures. As an alternative, the same random value may be used only for a limited (e.g., predetermined) number of signatures.

According to an embodiment, the length of the random value is larger than the length of the seed.

The length may refer to the bit size. It may also be that the random value has a smaller length (in bits) than the seed value.

According to an embodiment, the signature includes an elliptic curve algorithm.

The elliptic curve algorithm may be an Elliptic Curve Digital Signature Algorithm (ECDSA) or an Edwards-Curve Digital Signature Algorithm (EdDSA) according to RFC 8032.

According to an embodiment, the device is a hardware security module or it is part of a hardware security module.

Also, a vehicle is provided including at least one device as described herein.

In addition, a method is suggested for operating a device, wherein the device includes a cryptographic module, the method including:

operating the device either in a secure mode or in a non-secure mode, configuring the cryptographic module in the secure mode by storing a secret key and a seed value in the cryptographic module, generating a signature in the non-secure mode based on input data utilizing the secret key and the seed value of the cryptographic module.

According to an embodiment, the method further includes:

entering the non-secure mode after the configuration is concluded or after a startup phase of the device has ended.

In addition, a computer program product is suggested, which is directly loadable into a memory of a digital processing device, including software code portions for performing the steps of the method as described herein.

BRIEF DESCRIPTION OF THE DRAWINGS

Embodiments are shown and illustrated with reference to the drawing. The drawing serve to illustrate the basic principle, so that only aspects necessary for understanding the basic principle are illustrated.

FIG. 1 shows a schematic diagram of a device comprising a cryptographic module.

DETAILED DESCRIPTION

FIG. 1 shows a block diagram comprising a device 101 with a cryptographic module 102. The device 101 may be realized as a chip. The cryptographic module 102 may be a processor, a dedicated processor or a controller. The cryptographic module 102 may conduct at least one cryptographic function, e.g., compiling a signature T. The signature T is a function that is based on input data m (e.g., a message), a secret key s and a seed value a. The signature may be generated based on an elliptic curve algorithm, in particular an Elliptic Curve Digital Signature Algorithm (ECDSA) or an Edwards-Curve Digital Signature Algorithm (EdDSA) according to RFC 8032.

The device 101 is operable in either a secure mode or in a non-secure mode. If the device 101 is operated in the secure mode it may perform functions, which however are not available in the non-secure mode.

The cryptographic module 102 is configured with the secret key s and the seed value a. Such configuration exclusively happens during the secure mode. The cryptographic module 102 stores the secret key s and the seed value a, e.g., in an internal memory and/or register of the cryptographic module 102.

The cryptographic module 102 is configured in the secure mode of the device 101 and the signature T is compiled by the cryptographic module 102 when the device 101 is in the non-secure mode.

In the exemplary embodiment visualized in FIG. 1, a secure software 103 is operational during the secure mode of the device 101. It is noted that the secure software 103 may also be a secure firmware or a combination of secure software and firmware. "Secure" in this regard means that this software 103 is operational exclusively during the secure mode of the device 101; it is not operational during the non-secure mode of the device 101.

According to an example, the secure software 103 may be operational during a startup-phase or a configuration phase of the device 101 and then—after this startup or configuration phase is finished—the secure software 103 may become inactive or even terminated. Subsequently, the non-secure mode of the device 101 may be entered thereby having no access to the secure software 103 or the functionalities of the secure software 103, in particular no access to the secret key s or the seed value a. Hence, when the non-secure mode is active, neither the secret key s nor the seed value a can be modified, manipulated or stored with the cryptographic module 102.

The secure software 103 may be used to store the secret key s and the seed value a in the cryptographic module 102.

The device 101 may comprise a secured memory 104, which may be accessible for the secure software 103 (only). In one exemplary embodiment, the secret key s is read from the secured memory 104 by the secure software 103 and stored in the cryptographic module 102.

The secured memory 104 may be a memory or register that is hardened against attacks. It is also an option that the secret key s is hard-wired or hard-coded inside the secure software 103 so that it can (without using such secured memory 104) directly be stored to the cryptographic module 102.

The device 101 may comprise a true random generator TRG 105 that is capable of providing the seed value a with a high level of entropy. The TRG 105 may be part of the secure software 103 or a separate entity of the device 101. The TRG 105 may comprise hardware to ensure a high entropy of the seed value a. As an option, the seed value a may be supplied by an external unit as indicated by an arrow 107.

It is noted that the seed value a may be a true-random value or a pseudo-random value. It may even be an option that the seed value a is a value of reduced entropy and may be the result of a deterministic function, which may be generated by software and/or hardware.

The software and/or hardware to generate the seed value a may be part of the device 101, part of the secure software 103 or external to the device 101.

It is another option that a trigger 106 may indicate to the device that it shall:

enter the secure mode, terminate the secure mode and enter the non-secure mode, and re-enter the secure mode and terminate the non-secure mode.

The trigger 106 may exemplarily be conveyed to the secure software 103. The secure software 103 may be able to switch between the secure mode and the non-secure mode of the device 101. If the secure software 103 terminates, this may automatically result in entering the non-secure mode. As indicated above, at least one entity of the device has to ensure that either the secure mode or the non-secure mode is active, not both at the same time.

Optionally, the trigger 106 may be subject to authentication and/or encryption: In particular the secure mode may only be entered or re-entered in case the trigger 106 turns out to have the suitable level of authorization and/or authentication.

It is in particular an option that the device 101 comprises a non-secure software that conducts compiling the signature T using the cryptographic module 102 based on the input data m. This non-secure software has no access to the secret key s or the seed value a or any random value a' generated based on the seed. The non-secure software is run exclusively in the non-secure mode of the device 101.

It is also an option that another entity of the device controls supervision of the modes, i.e. the secure mode and the non-secure mode.

In the non-secure mode, the cryptographic module 102 may generate the signature T as a function f based on the input data m (e.g., a message), a random value a' and the secret key s:

$$T=f(m,a',s).$$

The random value a' is based on the seed value a. Hence, the seed value a can be used to generate a multitude of random values a'. For details about seed and random numbers, reference is made to, e.g., https://en.wikipedia.org/wiki/Random_seed.

As an option, the random value a' is generated based on the seed value a for each signature T or for each n-th signature compiled by the cryptographic module 102. Hence, the random value a' may be used once or for a predetermined number of times.

The device 101 may be a hardware security module or it may be part of a hardware security module.

The device 101 may be installed in a vehicle to increase the level of security.

The solution presented herein thus provides an efficient solution of a hardened device that is capable of providing digital signatures. The configuration, re-configuration or startup of the device is conducted in a secure mode that is terminated after the configuration or startup has ended. The subsequent non-secure mode allows generating signatures without having access to the security-critical information like the secret key or the seed value.

In one or more examples, the functions described herein may be implemented at least partially in hardware, such as specific hardware components or a processor. More generally, the techniques may be implemented in hardware, processors, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium, i.e., a computer-readable transmission medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more central processing units (CPU), digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a single hardware unit or provided by a collection of interoperative hardware units, including one or more processors as described above, in conjunction with suitable software and/or firmware.

Although various exemplary embodiments of the invention have been disclosed, it will be apparent to those skilled in the art that various changes and modifications can be made which will achieve some of the advantages of the invention without departing from the spirit and scope of the invention. It will be obvious to those reasonably skilled in the art that other components performing the same functions may be suitably substituted. It should be mentioned that features explained with reference to a specific FIGURE may be combined with features of other FIGURES, even in those cases in which this has not explicitly been mentioned. Further, the methods of the invention may be achieved in either all software implementations, using the appropriate processor instructions, or in hybrid implementations that utilize a combination of hardware logic and software logic to achieve the same results. Such modifications to the inventive concept are intended to be covered by the appended claims.

What is claimed is:

1. A hardware security module operable in a secure mode and in a non-secure mode, the hardware security module comprising:
   a cryptographic module comprising at least one processor configured to conduct at least one cryptographic function, including compiling a signature based on input data, a secret key, and a seed value;
   a software module configured with a first software or a first firmware and a second software or a second firmware, wherein the software module is coupled to the cryptographic module, and wherein the first software or the first firmware is exclusively run during the secure mode and the second software or the second firmware is exclusively run during the non-secure mode; and
   a first secured memory accessible only by the software module via the first software or the first firmware, the first secured memory configured to store the secret key,
   wherein, during the secure mode, the first software or the first firmware is configured to read the secret key from the first secured memory and configure the cryptographic module by providing the secret key and the seed value to the cryptographic module for storing therein,
   wherein, during the non-secure mode, the cryptographic module is configured to generate a signature based on the input data utilizing the secret key and the seed value stored in the cryptographic module,
   wherein, during the non-secure mode, the cryptographic module is configured to generate the signature without granting the second software or the second firmware access to either the secret key or the seed value, and
   wherein only one of the secure mode or the non-secure mode is active at a time.

2. The hardware security module according to claim 1, wherein the hardware security module enters the non-secure mode after a configuring of the cryptographic module with the secret key and the seed value is concluded.

3. The hardware security module according to claim 1, wherein the secure mode is operated via the first software or the first firmware and the non-secure mode is operated via the second software or the second firmware.

4. The hardware security module according to claim 3, wherein the first software or the first firmware is:
   exclusively run during the secure mode,
   configured to exclusively read the secret key from the first secured memory of the hardware security module, and
   configured to store the secret key and the seed value in a second secured memory of the cryptographic module.

5. The hardware security module according to claim 4, wherein, during the non-secure mode, neither the secret key nor the seed value stored in the second secured memory of the cryptographic module can be modified or manipulated.

6. The hardware security module according to claim 5, wherein during the non-secure mode, the secret key stored in the first secured memory cannot be accessed by the second software or the second firmware.

7. The hardware security module according to claim 3, wherein upon termination of the first software or the first firmware the hardware security module enters the non-secure mode.

8. The hardware security module according to claim 3, wherein the second software or the second firmware has no access to the secret key or to the seed value.

9. The hardware security module according to claim 3, wherein the first software or the first firmware is configured to configure the cryptographic module during each startup phase of the hardware security module by providing a respective secret key and a respective seed value to the cryptographic module for storing therein.

10. The hardware security module according to claim 1, wherein the seed value is generated by the hardware security module or by an external hardware security module and supplied to the cryptographic module by the first software or the first firmware.

11. The hardware security module according to claim 1, wherein, during the non-secure mode, the cryptographic module is configured to generate a random value based on the seed value and generate the signature based on the random value.

12. The hardware security module according to claim 11, wherein the cryptographic module is configured to generate a plurality of signatures and generate the random value based on the seed value for each signature or for each n-th signature of the plurality of signatures, wherein n is an integer greater than 1.

13. The hardware security module according to claim 11, wherein a length of the random value is larger than a length of the seed value.

14. The hardware security module according to claim 1, wherein the signature comprises an elliptic curve algorithm.

15. The hardware security module according to claim 1, wherein, during the non-secure mode, the cryptographic module is configured to generate the signature without granting the software module access to either the secret key or the seed value.

16. The hardware security module according to claim 1, wherein, during the non-secure mode, the software module does not have access to either the secret key or the seed value.

17. The hardware security module according to claim 1, wherein the cryptographic module, the software module, and the first secured memory are separate hardware components with the software module coupled to and between the cryptographic module and the first secured memory.

18. The hardware security module according to claim 1, wherein the cryptographic module does not have any access to the first secured memory.

19. The hardware security module according to claim 1, wherein the cryptographic module only generates signatures while the second software or the second firmware is running and does not generate the signatures while the first software or the first firmware is running.

20. A vehicle, comprising:
   a hardware security module operable in a secure mode and in a non-secure mode, with only one of the secure mode or the non-secure mode being active at a time, and comprising:

a cryptographic module comprising at least one processor configured to conduct at least one cryptographic function, including compiling a signature based on input data, a secret key, and a seed value, a software module configured with a first software or a first firmware and a second software or a second firmware, wherein the first software or the first firmware is exclusively run during the secure mode and the second software or the second firmware is exclusively run during the non-secure mode, and a first secured memory accessible only by the software module via first software or the first firmware, the first secured memory configured to store the secret key, wherein, during the secure mode, the first software or the first firmware is configured to read the secret key from the first secured memory and configure the cryptographic module by providing the secret key and the seed value to the cryptographic module for storing therein, wherein, during the non-secure mode, the cryptographic module is configured to generate a signature based on the input data utilizing the secret key and the seed value stored in the cryptographic module, and wherein, during the non-secure mode, the cryptographic module is configured to generate the signature without granting the second software or the second firmware access to either the secret key or the seed value.

21. A method for operating a device, wherein the device comprises a cryptographic module, the method comprising:

operating the device in either a secure mode or a non-secure mode, with only one of the secure mode or the non-secure mode being active at a time, wherein a first software or a first firmware is exclusively run during the secure mode and a second software or a second firmware is exclusively run during the non-secure mode;

storing a secret key in a first secured memory that is only accessible by the first software or the first firmware;

configuring, by the first software or a first firmware, the cryptographic module during the secure mode by storing the secret key and a seed value in the cryptographic module, wherein, during the secure mode, the first software or the first firmware is configured to read the secret key from the first secured memory and configure the cryptographic module by providing the secret key and the seed value to the cryptographic module for storing therein, wherein, during the non-secure mode, generating, by the cryptographic module, a signature based on input data utilizing the secret key and the seed value stored in the cryptographic module, and wherein, during the non-secure mode, preventing, by the cryptographic module, the second software or the second firmware access to either the secret key or the seed value stored in the cryptographic module.

22. The method according to claim 21, further comprising:

entering the non-secure mode after a configuration of the cryptographic module is concluded or after a startup phase of the device has ended.

23. A non-transitory computer-readable medium having recorded thereon a computer program product directly loadable into a memory of a digital processing device, the computer program product comprising software code portions for performing the method of claim 21.

* * * * *